United States Patent
Goto

(10) Patent No.: US 11,018,868 B2
(45) Date of Patent: May 25, 2021

(54) COMMUNICATION APPARATUS, METHOD AND PROGRAM FOR CONTROLLING THE APPARATUS, AND STORAGE MEDIUM STORING THE PROGRAM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 539 days.

(21) Appl. No.: 15/548,725

(22) PCT Filed: Jan. 15, 2016

(86) PCT No.: PCT/JP2016/000199
§ 371 (c)(1),
(2) Date: Aug. 3, 2017

(87) PCT Pub. No.: WO2016/129209
PCT Pub. Date: Aug. 18, 2016

(65) Prior Publication Data
US 2018/0034637 A1 Feb. 1, 2018

(30) Foreign Application Priority Data
Feb. 9, 2015 (JP) .............................. JP2015-023713

(51) Int. Cl.
*H04W 12/06* (2021.01)
*H04W 12/08* (2021.01)
(Continued)

(52) U.S. Cl.
CPC ............ *H04L 9/3226* (2013.01); *G06F 21/36* (2013.01); *H04L 9/085* (2013.01); *H04L 9/0819* (2013.01);
(Continued)

(58) Field of Classification Search
CPC ...... H04L 9/3226; G06F 21/36; H04W 12/08; H04W 12/003; H04W 12/00522
See application file for complete search history.

(56) References Cited

U.S. PATENT DOCUMENTS 8,797,856 B1 * 8/2014 Ballal ..................... H04W 4/70
370/230
9,203,824 B1 * 12/2015 Nunn ...................... H04L 63/08
(Continued)

FOREIGN PATENT DOCUMENTS

| JP | 2006261939 A | 9/2006 |
|---|---|---|
| JP | 2008004975 A | 1/2008 |

(Continued)

OTHER PUBLICATIONS

C. Rignet, et al., Remote Authentication Dial in User Service (RADIUS), Network Working Group, Request for Comments 2865, Jun. 30, 2000, pp. 1-77, The Internet Society.

*Primary Examiner* — Alexander Lagor
(74) *Attorney, Agent, or Firm* — Canon U.S.A., Inc. I.P. Division

(57) ABSTRACT

The present invention relates to a communication apparatus including a receiving unit and a restricting unit. The receiving unit is configured to receive a signal from another communication apparatus after code information is displayed by a display control unit. The signal includes identification information indicated by the code information. The code information is information in which information necessary for performing a sharing process for sharing a communication parameter for radio communication among apparatuses is coded. The restricting unit is configured to restrict execution of the sharing process when the communication apparatus has received the signal including the
(Continued)

identification information from a plurality of other communication apparatuses with the receiving unit.

11 Claims, 7 Drawing Sheets

(51) Int. Cl.
| | | |
|---|---|---|
| *H04L 9/00* | (2006.01) | |
| *H04L 9/32* | (2006.01) | |
| *G06F 21/36* | (2013.01) | |
| *H04W 12/50* | (2021.01) | |
| *H04L 9/08* | (2006.01) | |
| *H04L 9/14* | (2006.01) | |
| *H04L 9/30* | (2006.01) | |
| *H04W 12/77* | (2021.01) | |

(52) U.S. Cl.
CPC ............... *H04L 9/14* (2013.01); *H04L 9/30* (2013.01); *H04W 12/08* (2013.01); *H04W 12/50* (2021.01); *H04W 12/77* (2021.01)

(56) References Cited

U.S. PATENT DOCUMENTS

| | | | | |
|---|---|---|---|---|
| 2013/0251149 | A1* | 9/2013 | Xu ..................... | H04W 12/02 380/270 |
| 2015/0070594 | A1* | 3/2015 | Trachtenberg ........... | H04N 5/64 348/841 |
| 2015/0288670 | A1* | 10/2015 | Bhooshan ............. | H04W 12/06 726/7 |
| 2016/0037307 | A1* | 2/2016 | Roth ..................... | H04W 4/12 709/206 |

FOREIGN PATENT DOCUMENTS

| | | |
|---|---|---|
| JP | 4183271 B2 | 11/2008 |
| JP | 2009171565 A | 7/2009 |
| JP | 2009239573 A | 10/2009 |
| JP | 2013-081248 A | 5/2013 |
| JP | 2013207494 A | 10/2013 |
| JP | 2014-011786 A | 1/2014 |
| JP | 2014-060623 A | 4/2014 |
| JP | 2014-230152 A | 12/2014 |
| WO | 2012/167200 A1 | 12/2012 |
| WO | 2014/051861 A1 | 4/2014 |

* cited by examiner

[Fig. 1]
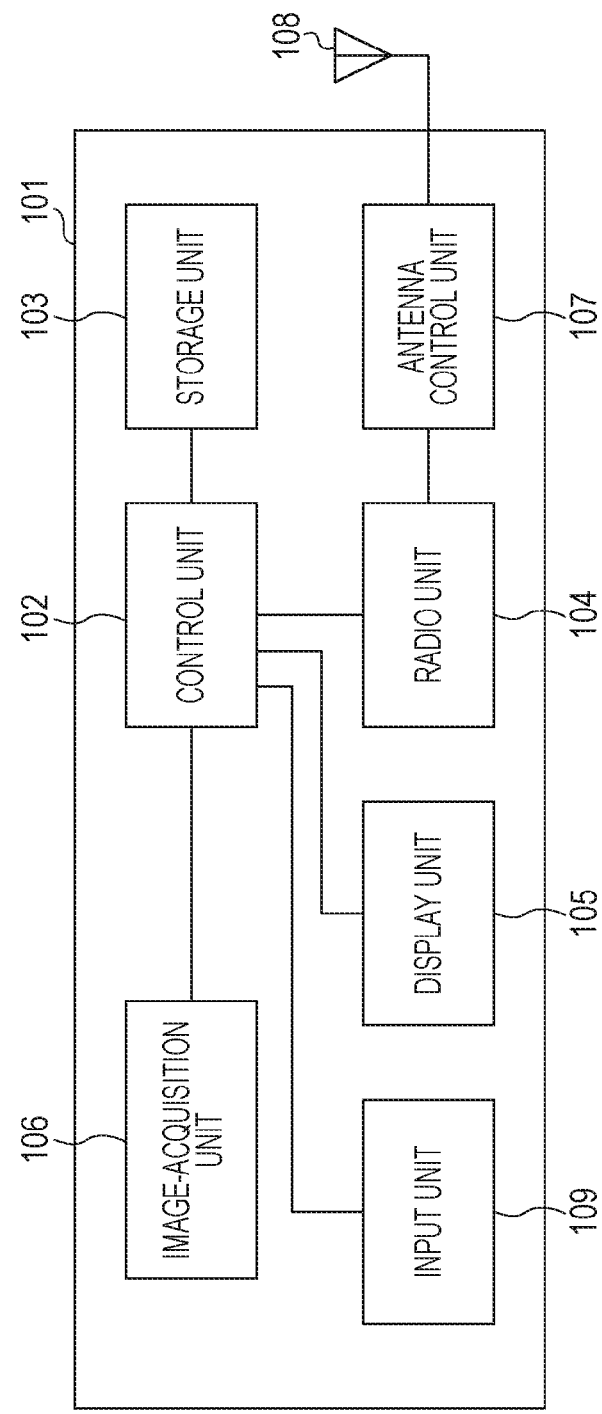

[Fig. 2]
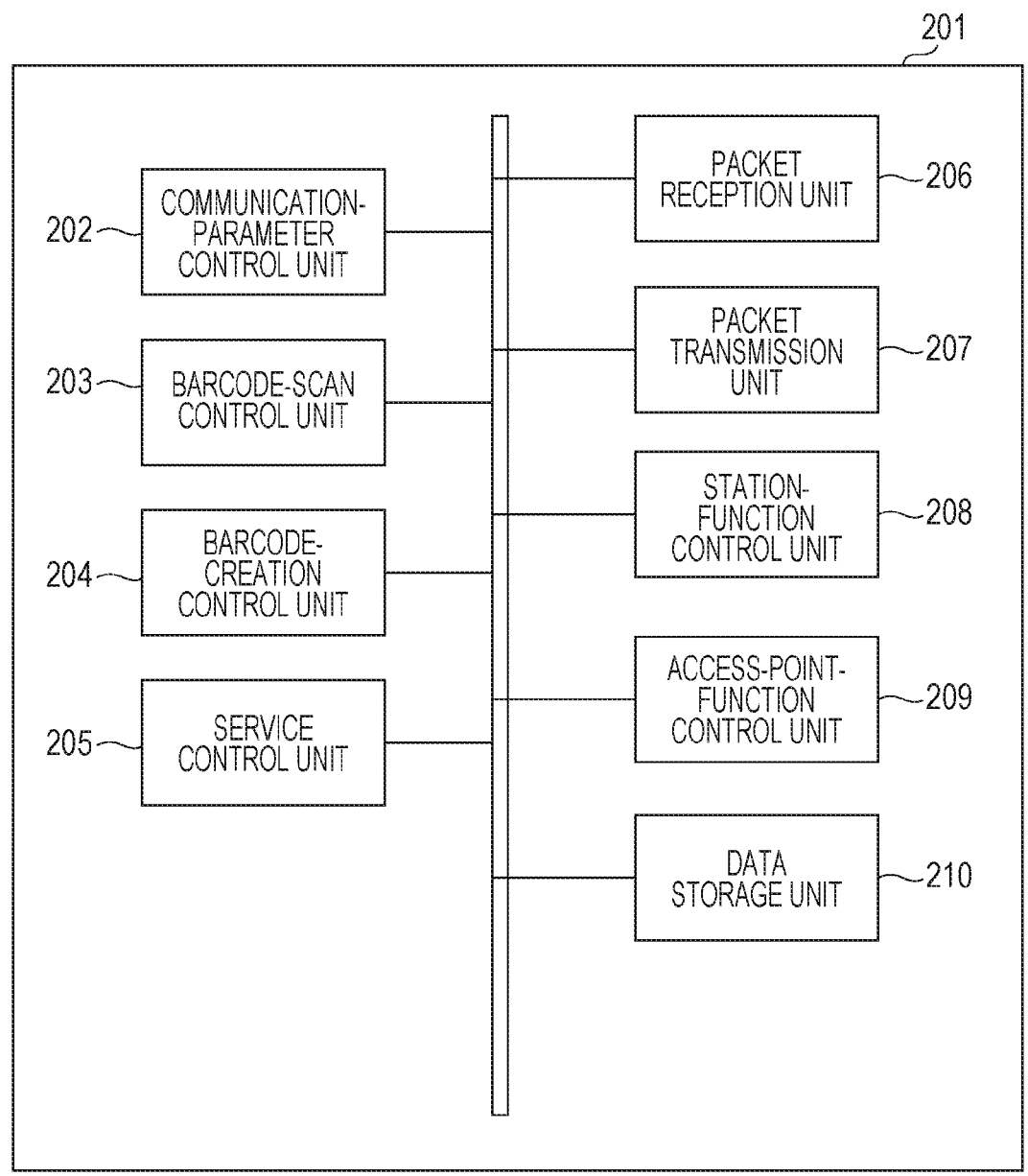

[Fig. 3]
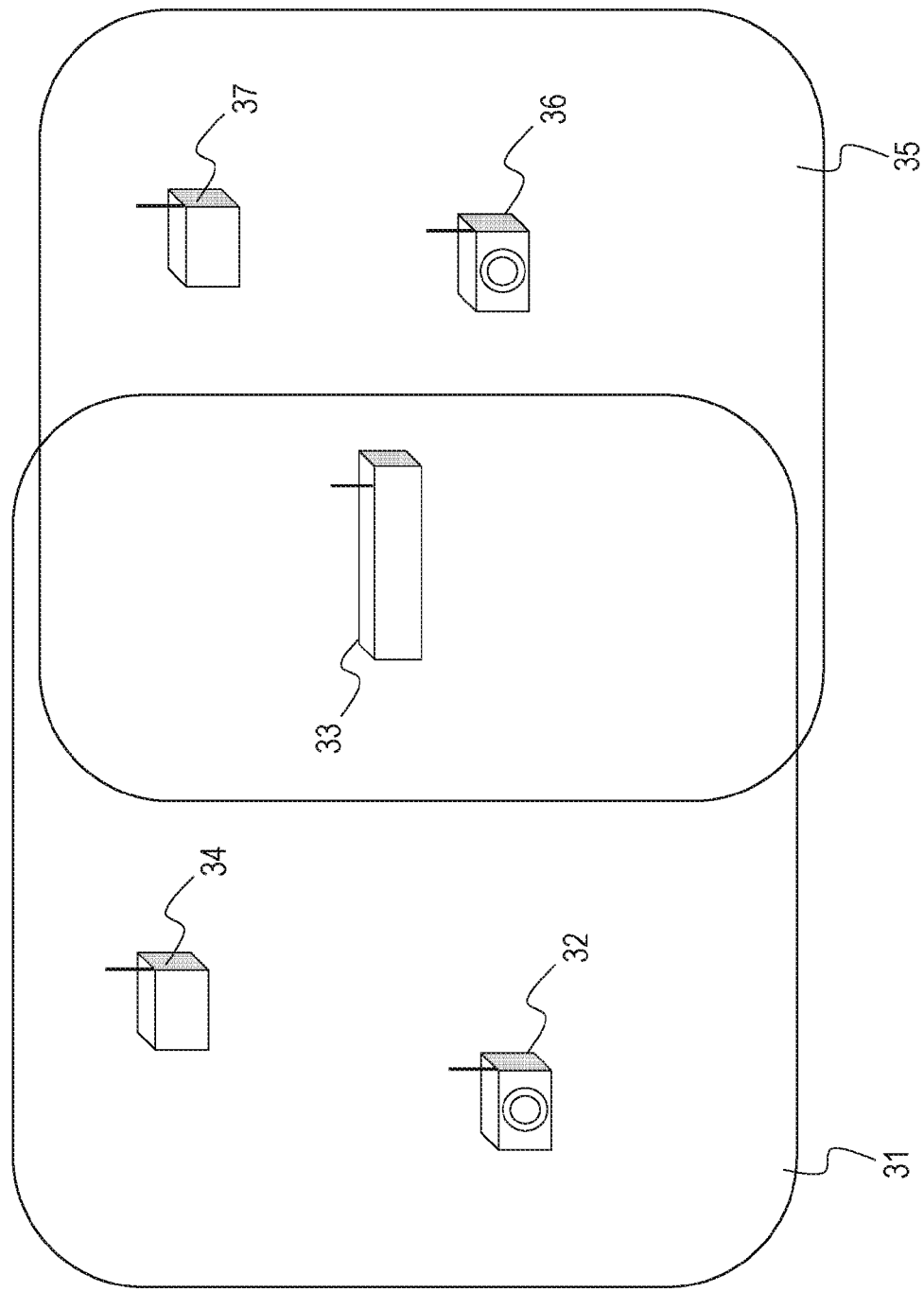

[Fig. 4]
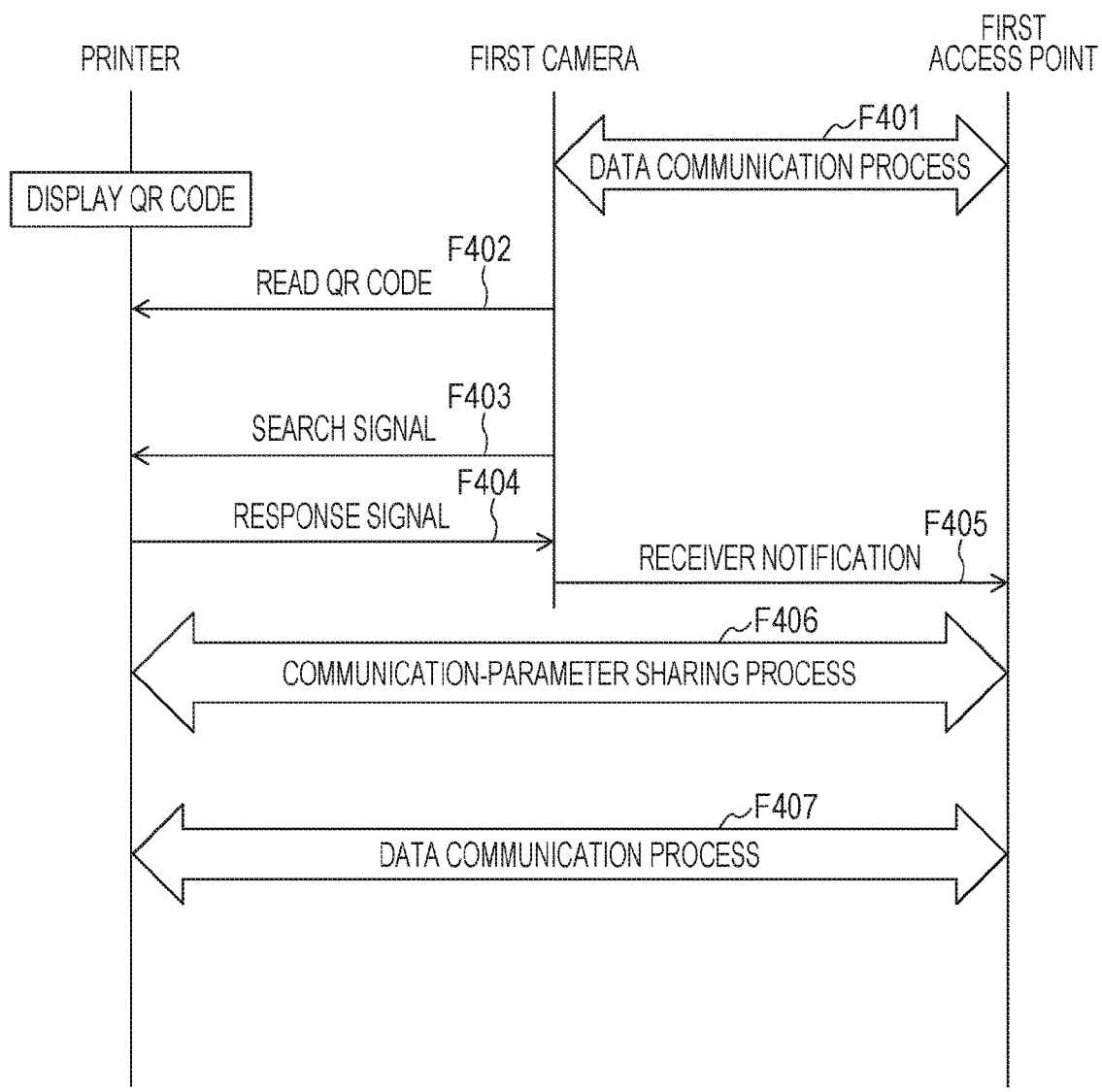

[Fig. 5]
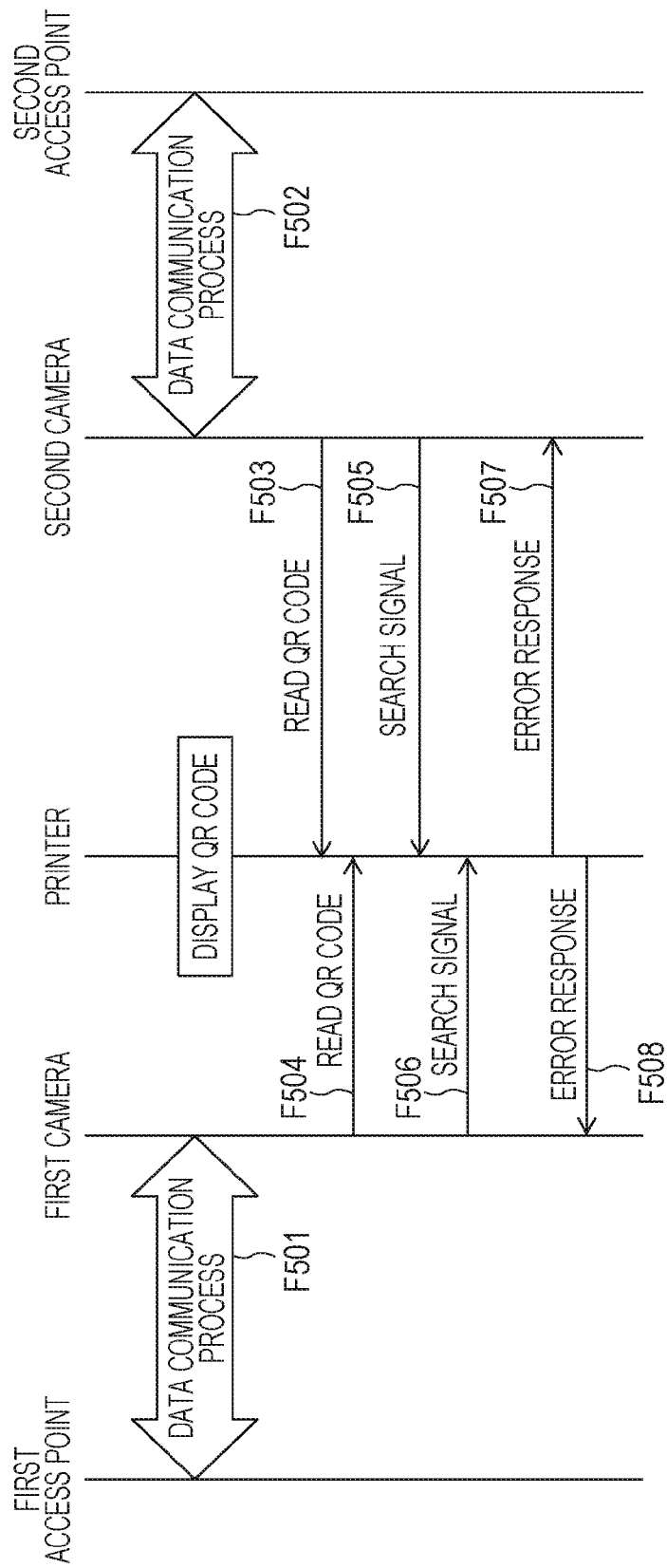

[Fig. 6]
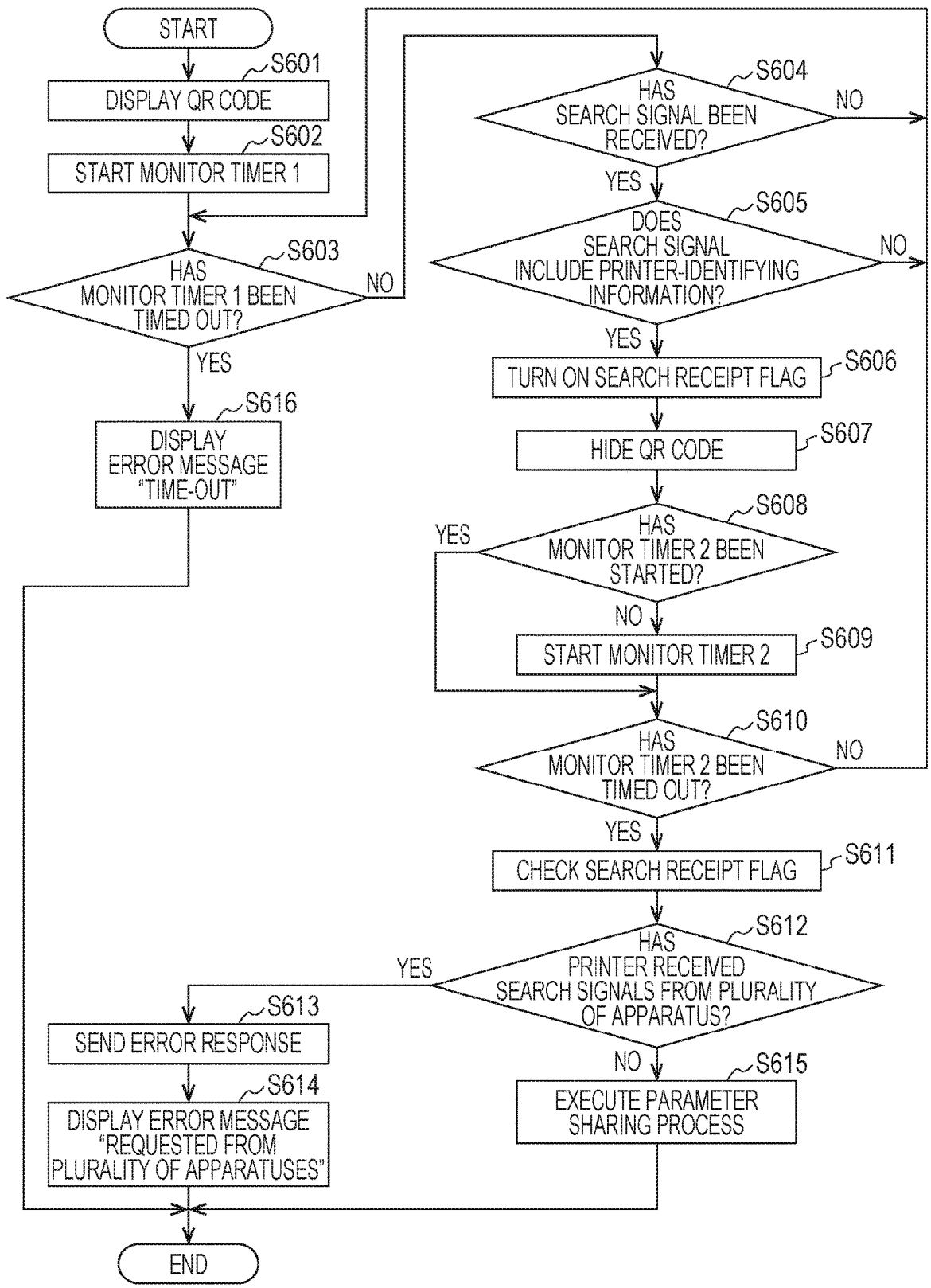

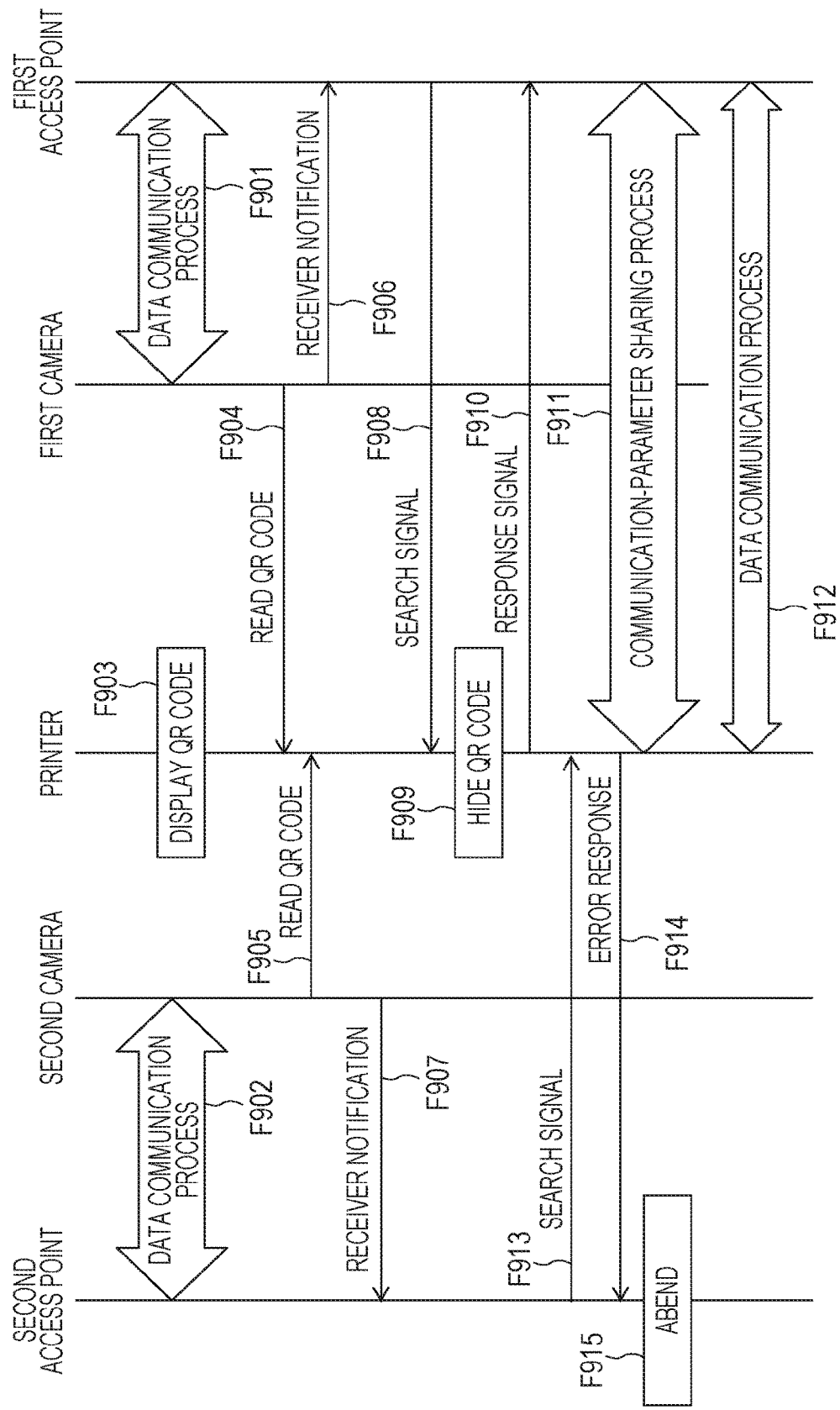
[Fig. 7]

COMMUNICATION APPARATUS, METHOD AND PROGRAM FOR CONTROLLING THE APPARATUS, AND STORAGE MEDIUM STORING THE PROGRAM

TECHNICAL FIELD

The present invention relates to a communication technique.

BACKGROUND ART

Recent electronic apparatuses, such as digital cameras, printers, mobile phones, and smartphones, have a radio communication function and are connected to a radio network.

To connect electronic apparatuses to a radio network, it is necessary to set various communication parameters, such as an encryption method, an encryption key, an authentication method, and an authentication key. A technique for easily setting the communication parameters is disclosed in PTL 1. This is a technique such that a mobile phone reads a QR code (a registered trademark, the rest is omitted) indicating communication parameters, which is displayed by an electronic apparatus, and the read communication parameters are set at an access point. The setting of communication parameters by acquiring an image of code information in which a lot of information is coded, such as a two-dimensional code, allows the user to reduce or eliminate a cumbersome entry task. However, if a plurality of mobile phones acquire an image of code information on an electronic apparatus almost at the same time, the communication parameters can be automatically set in unintended apparatuses.

CITATION LIST

Patent Literature

PTL 1: Japanese Patent Laid-Open No. 2014-60623
PTL 2: Japanese Patent Laid-Open No. 2014-230152

SUMMARY OF INVENTION

The present invention provides a communication apparatus including a receiving unit and a restricting unit. The receiving unit is configured to receive a signal from another communication apparatus. The signal includes identification information indicated by code information in which information necessary for performing a sharing process for sharing a communication parameter for performing radio communication among apparatuses is coded. The restricting unit is configured to restrict execution of the sharing process when the communication apparatus has received the signal including the identification information from a plurality of other communication apparatuses with the receiving unit.

Further features of the present invention will become apparent from the following description of exemplary embodiments with reference to the attached drawings.

BRIEF DESCRIPTION OF DRAWINGS

FIG. 1 is a diagram illustrating the configuration of a communication apparatus according to a first embodiment of the present invention.

FIG. 2 is a block diagram illustrating an example of the configuration of software functional blocks of the communication apparatus according to the first embodiment.

FIG. 3 is a diagram illustrating an example of the configuration of a communication system according to the first embodiment.

FIG. 4 is a diagram illustrating an example of the connection sequence of the communication system according to the first embodiment.

FIG. 5 is a diagram illustrating another example of the connection sequence of the communication system according to the first embodiment.

FIG. 6 is a flowchart illustrating the operation of the communication apparatus according to the first embodiment.

FIG. 7 is a diagram illustrating a connection sequence of a communication system according to a second embodiment of the present invention.

DESCRIPTION OF EMBODIMENTS

According to an embodiment, in a case where a communication apparatus executes a communication-parameter sharing process according to displayed code information, if the communication apparatus detects a plurality of apparatuses that have transmitted identification information included in the code information, the communication apparatus restricts execution of the communication-parameter sharing process.

First Embodiment

A communication apparatus according to a first embodiment of the present invention will be described in detail hereinbelow with reference to the drawings. This is an example in which a wireless LAN system conforming to an IEEE (The Institute of Electrical and Electronics Engineers, Inc.) 802.11 series is used. It will be appreciated that the wireless LAN system conforming to IEEE802.11 is given for mere example, and any other communication system can be used in the invention.

FIG. 3 illustrates a communication system according to this embodiment. The communication system illustrated in FIG. 3 includes a first camera 32, a printer 33, a first access point (hereinafter referred to as AP) 34, a second camera 36, and a second AP 37. A first radio network 31 is a wireless LAN network that the first AP 34 forms. A second radio network 35 is a wireless LAN network that the second AP 37 forms.

In this embodiment, the first AP 34 and the second AP 37 operate as access points in an infrastructure mode defined by the IEEE802.11 standard. The other apparatuses operate as stations (STAs) in the infrastructure mode defined by the IEEE802.11 standard.

Although the apparatuses in the communication system according to this embodiment are cameras and printers, the apparatuses may be mobile phones, PCs, video cameras, smart watches, personal digital assistants (PDAs), and any other apparatuses.

The hardware configuration of the apparatuses of the communication system according to this embodiment illustrated in FIG. 3 will be described with reference to FIG. 1. FIG. 1 illustrates the general arrangement of a communication apparatus 101. A control unit 102 controls the entire communication apparatus 101 by implementing a control program stored in a storage unit 103. An example of the control unit 102 is a central processing unit (CPU). The storage unit 103 stores the control program that the control unit 102 implements, image data, and various information, such as a communication parameter. Various operations described below are executed by implementing the control program stored in the storage unit 103 with the control unit 102. Examples of the storage unit 103 include storage media, such as a hard disk drive (HDD), a flash memory, and a removable secure digital (SD) card.

A radio unit 104 performs wireless LAN communication conforming to the IEEE802.11 series. The radio unit 104 is formed of a radio communication chip. A display unit 105 shows various information. The display unit 105 has a function of outputting visually recognizable information, such as an LCD and an LED, or outputting sound, such as a speaker. In other words, the display unit 105 is capable of outputting at least one of visual information and audio information. If the display unit 105 displays visual information, the display unit 105 includes a video RAM (VRAM) for storing image data corresponding to the visual information to be displayed. The display unit 105 performs such display control as to continuously display the image data stored in the VRAM on an LCD or an LED.

An image-acquisition unit 106 includes an image sensor and a lens. The image-acquisition unit 106 takes photographs and motion pictures. The image-acquisition unit 106 reads code information, such as barcodes, two-dimensional codes, and QR (abbreviated from quick response) codes.

An antenna control unit 107 controls the output of an antenna 108. The antenna 108 allows communication in a 2.4 GHz band and/or a 5 GHz band for wireless LAN communication. An input unit 109 receives various input operations from the user. The communication apparatus 101 is operated in response to input operations received by the input unit 109. The input unit 109 stores a flag corresponding to the input in a memory, such as the storage unit 103.

FIG. 2 is a block diagram illustrating an example of the configuration of software functional blocks for implementing a communication control function, described later. In this embodiment, the individual functional blocks of the apparatus are stored as programs in the storage unit 103, and the functions are achieved by implementing the programs with the control unit 102. The control unit 102 achieves the functions by controlling the hardware and performing operations and processes on information. Part or all of the functional blocks may be implemented by hardware. In this case, an example of the part or all of the functional blocks is an application specific integrated circuit (ASIC).

FIG. 2 illustrates the entire software functional blocks 201. A communication-parameter control unit 202 implements a communication-parameter sharing process for sharing a communication parameter between apparatuses. In the communication-parameter sharing process, a providing apparatus provides the communication parameter for radio communication to a receiving apparatus. The communication parameter includes all or at least one of radio communication parameters necessary for wireless LAN communication, such as a service set identifier (SSID), which is a network identifier, an encryption method, an encryption key, an authentication method, and an authentication key. The communication parameter may further include a MAC address, a pass phrase, an IP address for communication in an IP layer, and information necessary for higher-level services. The communication-parameter sharing process that the communication-parameter control unit 202 implements may be Wi-Fi protected setup (WPS) or Wi-Fi Direct defined by Wi-Fi alliance.

A barcode-scan control unit 203 analyzes an image acquired by the image-acquisition unit 106 to obtain encoded code information. The barcode-scan control unit 203 performs a process for analyzing code information, such as two-dimensional code, for example, a barcode and a QR code.

A barcode-creation control unit 204 controls creation of code information, such as two-dimensional code including a barcode and a QR code, and display of the created code information on the display unit 105. A service control unit 205 controls execution of services in application layers. The application layers are service providing layers in fifth or higher layers in the open system interconnection (OSI) reference model. In other words, the service control unit 205 executes printing, image streaming, and file transferring by means of radio communication using the radio unit 104.

A packet reception unit 206 and a packet transmission unit 207 controls transmission and reception of all packets including a communication protocol for upper layers. The packet reception unit 206 and the packet transmission unit 207 also control the radio unit 104 to transmit and receive packets conforming to the IEEE802.11 standard to and from a target apparatus.

A station-function control unit 208 provides a station (STA) function that operates as a station in an infrastructure mode defined by the IEEE802.11 standard. The STA-function control unit 208 executes authentication and encryption processing before operating as a STA. An access-point-function control unit 209 provides an access point (AP) function that operates as an access point in the infrastructure mode defined by the IEEE802.11 standard. The AP-function control unit 209 forms a radio network and executes authentication and encryption processing on the STA an management of the STA. A data storage unit 210 controls the software itself and writing and reading of a communication parameter, a barcode, and other information to and from the storage unit 103.

The above functional blocks are given for mere illustration; a plurality of functional blocks may constitute one functional block, or some of functional blocks may be divided into blocks for performing a plurality of functions.

The operation of the thus-configured communication system will be described. FIG. 4 illustrates a connection sequence for setting communication among the first camera 32, the printer 33, and the first AP 34. This example shows a case in which the printer 33 joins the first radio network 31 established by the first AP 34. In FIG. 4, the first camera 32 holds a communication parameter for connecting to the first radio network 31 formed by the AP 34 for communication and is performing data communication via the AP 34 (F401).

The printer 33 causes a QR code in which information necessary for setting a communication parameter is embedded to be displayed on the display unit 105 of the printer 33 according to a user operation.

If an instruction to perform a communication-parameter setting mode is given by the user, the printer 33 displays the QR code in which information necessary for setting a communication parameter is embedded.

The first camera 32 reads the QR code displayed on the printer 33 using the image-acquisition unit 106 of the first camera 32 (F402). The first camera 32 decodes the read QR code to acquire information that the QR code indicates. The first camera 32 determines whether the information acquired from the QR code is information necessary for setting a communication parameter. Examples of the information necessary for setting a communication parameter include information for use in encryption in communicating a communication parameter and apparatus identification information. Examples of the information for use in encryption in communicating a communication parameter include a public key and a certificate. An example of a method for encrypting a communication parameter using a public key in the communication-parameter sharing process is disclosed in PTL 2. Examples of the apparatus identification information include a media access control (MAC) address and a universally unique identifier (UUID) for uniquely identifying the apparatus. An example of the information necessary for setting a communication parameter is an identifier indicating the communication-parameter sharing process. Another example of the information necessary for setting a communication parameter is identification information, such as a one-time password including a QR code. A yet another example of the information necessary for setting a communication parameter includes the communication parameter itself.

If the content of the QR code is information necessary for setting a communication parameter, the first camera 32 transmits a search signal for searching for an apparatus that the identification information in the information in the QR code indicates via the radio unit 104 (F403). The search signal may be a probe request defined by the IEEE802.11 or an action frame defined by the IEEE802.11. The search signal may be a probe request that indicates an apparatus indicated by the identification information in the information read from the QR code. The search signal may include information indicating that a communication-parameter setting process is active or is enabled.

The printer 33 returns a response signal in response to the search signal from the first camera 32 (F404). The first camera 32 detects a apparatus that has the identification information included in the information read from the QR code by transmitting and receiving the signals at F403 and F404. When the first camera 32 detects the printer 33, the first camera 32 transmits a receiver notification for notifying the first AP 34, which is the base station of the first radio network 31 to which the first camera 32 connects, of the receiver (the printer 33) in the communication-parameter sharing process via the radio unit 104 (F405). The receiver notification includes identification information for identifying the printer 33.

Although the receiver notification at F405 is given via the radio network 31, which is a secure link established between the first camera 32 and the first AP 34, the receiver notification may be sent using a secure link different from the radio network 31. For example, the receiver notification may be given using secure near radio communication, such as near field communication (NFC). The receiver notification may be given using communication other than wireless LAN communication, such as Bluetooth (a registered trademark). The first camera 32 may give the receiver notification by displaying the information necessary for setting the communication parameter read from the acquired QR code on the display unit 105 of the first camera 32 so that the first AP 34 can read the information.

When the first AP 34 receives the receiver notification, the first AP 34 executes the process for sharing the communication parameter with the printer 33 indicated by the identification information in the receiver notification. (F406). In the communication-parameter sharing process, a communication parameter encrypted using a public key may be transferred between the first AP 34 and the printer 33. An example of the method is disclosed in PTL 2.

After the printer 33 shares the communication parameter transferred from the first AP 34 by radio communication using the radio unit 104 of the printer 33, the printer 33 connects to the radio network 31 that the first AP 34 forms using the acquired communication parameter. The printer 33 performs data communication via the first AP 34 (F407). In the data communication at F407, the printer 33 may use the Internet to which the first AP 34 connects or may receive the image acquired by the first camera 32 via the first AP 34 and may print the received image.

The operation illustrated in FIG. 4 is of an example in which an image of a QR code displayed by the printer 33 is acquired by a single apparatus. FIG. 5 illustrates a case in which a plurality of apparatuses acquire an image of a QR code displayed by the printer 33. FIG. 5 illustrates a connection sequence for setting communication among the first camera 32, the printer 33, the first AP 34, the second camera 36, and the second AP 37.

In FIG. 5, the first camera 32 holds a communication parameter for connecting to the first radio network 31 formed by the first AP 34 for communication and is performing data communication via the first AP 34 (F501). Similarly, the second camera 36 holds a communication parameter for connecting to the second radio network 35 formed by the second AP 37 for communication and is performing data communication via the second AP 37. (F502).

The printer 33 causes a QR code in which information necessary for setting a communication parameter is embedded to be displayed on the display unit 105 according to a user operation.

The first camera 32 and the second camera 36 read the QR code displayed on the printer 33 using the respective image-acquisition units 106 (F503 and F504). The first camera 32 and the second camera 36 decode the read QR code to acquire information that the QR code indicates. The first camera 32 and the second camera 36 determine whether the information acquired from the QR code is information necessary for setting a communication parameter.

If the content of the QR code is information necessary for setting a communication parameter, the first camera 32 and the second camera 36 transmit search signals for searching for an apparatus that the identification information in the information in the QR code indicates via the respective radio units 104 (F505 and F506).

Because the printer 33 has received the search signals from a plurality of communication apparatuses, that is, the first camera 32 and the second camera 36, the printer 33 recognizes that an image of the displayed QR code is acquired by the plurality of apparatuses. Since the printer 33 has received the search signals from the plurality of communication apparatuses, that is, the first camera 32 and the second camera 36, the printer 33 transmits an error response to the first camera 32 and the second camera 36 via the radio units 104 of the printer 33 (F507 and F508). The error response is information indicating an error in the communication-parameter sharing process. When the printer 33 transmits an error response, the printer 33 disables execution of the communication-parameter sharing process. Upon reception of the error response, the first camera 32 and the second camera 36 terminates the process in error.

Thus, if the printer 33 detects a plurality of apparatuses that have imaged code information including identification information displayed by the printer 33 and that have transmitted the identification information, the printer 33 restricts execution of the communication-parameter sharing process. This allows the printer 33 to disable connection with unintended apparatuses.

The operation of the printer 33 will next be described with reference to a flowchart illustrated in FIG. 6. The flowchart illustrated in FIG. 6 is implemented by calculating and processing information and controlling the hardware by implementing the control program stored in the storage unit 103 with the control unit 102 of the printer 33. Part or all of the step in the flowchart illustrated in FIG. 6 may be implemented by hardware, such as an ASIC.

The flowchart in FIG. 6 is started when an instruction to set to a communication-parameter setting mode is given by the user via the input unit 109 of the printer 33. When the printer 33 is set to the communication-parameter setting mode, the printer 33 causes a QR code in which information necessary for setting a communication parameter is encoded to be displayed on the display unit 105 of the printer 33 (S601). Examples of the information necessary for setting a communication parameter include a communication parameter, apparatus identification information, a public key, and identification information on the communication-parameter sharing process.

When an instruction to set to the communication-parameter setting mode is given, the printer 33 starts a monitor timer 1 for measuring a predetermined time during which the communication-parameter sharing process is made active (S602). When the monitor timer 1 is timed up, the communication-parameter setting mode is terminated. The monitor timer 1 is set to about two minutes. The printer 33 always checks whether the monitor timer 1 is timed out during the processing (S603). When the monitor timer 1 is timed out, the printer 33 displays information, such as "time-out", on the display unit 105 and notifies the user of an abend (S616) to terminate the process.

Next, the printer 33 determines whether the printer 33 has received a search signal via the radio unit 104 (S604). The printer 33 waits for reception of a search signal until the monitor timer 1 is timed out. Upon reception of a search signal, the printer 33 determines whether the received search signal includes identification information on the printer 33, which is the content of the displayed QR code (S605). The determination at S605 may include determination whether the search signal includes information on the communication-parameter sharing process. An example of the information on the communication-parameter sharing process is identification information on the communication-parameter sharing process.

If the received search signal does not include identification information on the printer 33, the printer 33 ignores the search signal. Alternatively, when the received search signal does not include identification information on the printer 33, the printer 33 transmits a response signal including no information for requesting a communication parameter. An example of the information for requesting a communication parameter is information on the communication-parameter sharing process.

If the received search signal include identification information on the printer 33, the printer 33 turns on a search receipt flag (S606). The search receipt flag is a flag that holds information on the transmission source of the search signal and indicates that the printer 33 has received a search signal from the apparatus that has acquired an image of the displayed QR code.

If the search signal includes identification information on the printer 33, the printer 33 hides the displayed QR code (S607). This is for the purpose of indicating that at least one apparatus has completed reading of the QR code and for preventing another apparatus from acquiring an image of the QR code. Thus, when the printer 33 receives a signal including information in the QR code from another apparatus after displaying the QR code on the display unit 105, the printer 33 hides the QR code. This allows the printer 33 to reduce the probability that an image of the QR code is acquired by a plurality of apparatuses, thus reducing the probability that a communication parameter is automatically set by unintended apparatuses.

If the received search signal includes identification information on the printer 33, the printer 33 determines whether a monitor timer 2 for detecting that a plurality of apparatuses have acquired an image of the QR code and have started a process for setting a communication parameter (S608).

If the monitor timer 2 has not been started, the printer 33 starts the monitor timer 2 for detecting that a plurality of apparatuses have acquired an image of the QR code and have started the process for setting a communication parameter (S609). This monitor timer 2 is set to about 5 seconds to 10 seconds shorter than the monitor timer 1 to detect that a plurality of apparatuses have acquired an image of the QR code at the same time. The printer 33 repeats the process from S603 until the monitor timer 2 is timed out (S610). After the monitor timer 2 is started, the QR code has already been hidden, and the process at S607 is omitted.

If the monitor timer 2 is timed out, the printer 33 refers to the search receipt flag (S611). The printer 33 determines from the result of reference to the search receipt flag whether the printer 33 has received search signals including identification information on the printer 33 from a plurality of apparatuses (S612). If the monitor timer 1 is timed out after the measurement of the monitor timer 2 is started and before the measurement of the monitor timer 2 is timed out, the measurement of the monitor timer 1 is continued until the measurement of the monitor timer 2 is timed out. If the measurement of the monitor timer 2 is started, the measurement of the monitor timer 1 may be stopped to prevent the time-out error at S616.

If the determination at S612 shows that the printer 33 has received a search signal not from a plurality of apparatus but only from one apparatus, the printer 33 performs the process for sharing a communication parameter with the transmission source of the search signal (S615). The printer 33 connects to a radio network using the communication parameter received by the communication-parameter sharing process for communication.

If the determination at S612 shows that the printer 33 has received search signals including identification information on the printer 33 from a plurality of apparatuses, the printer 33 transmits error responses indicating that the printer 33 has failed in the communication-parameter sharing process to the individual apparatuses (S613). The printer 33 displays an error message. "REQUESTED FROM TWO OR MORE APPARATUSES" and terminates the process (S614). In the process at S614, a predetermined error pattern may be displayed with LED to notify the error to the user.

Although this is a configuration in which apparatuses that have acquired an image of a QR code (the first camera 32 and the second camera 36) transmit search signals, apparatuses that have received a receiver notification (the first AP 34 and the second AP 37) may transmit search signals. In this case, for example, the first camera 32 that has acquired an image of the QR code on the printer 33 transmits a receiver notification to the first AP 34 without transmitting a search signal. Then, the first AP 34 transmits a search signal for searching for an apparatus that identification information in the receiver notification indicates.

As described above, according to this embodiment, if a plurality of apparatuses have imaged displayed code information almost at the same time, the printer 33 restricts execution of the communication-parameter sharing process. This allows the printer 33 to disable connection with unintended apparatuses.

Second Embodiment

A second embodiment is an example in which if a plurality of apparatuses are detected, the communication-parameter sharing process is started for the first detected apparatus, and execution of the communication-parameter sharing process is disabled for the next detected apparatus. In the second embodiment, an access point that has received a receiver notification from an apparatus that has acquired an image of the QR code searches for the apparatus indicated by identification information in the receiver notification. The configuration of the apparatuses in this embodiment are the same as the configuration of the first embodiment.

FIG. 7 illustrates a connection sequence for setting communication among the first camera 32, the printer 33, the first AP 34, the second camera 36, and the second AP 37.

In FIG. 7, the first camera 32 holds a communication parameter for connecting to the first radio network 31 formed by the first AP 34 for communication and is performing data communication via the first AP 34 (F901). Similarly, the second camera 36 holds a communication parameter for connecting to the second radio network 35 formed by the second AP 37 for communication and is performing data communication via the second AP 37 (F902).

The printer 33 causes a QR code in which information necessary for setting a communication parameter is embedded to be displayed on the display unit 105 according to a user operation. (F903). An example of the information for setting a communication parameter is identification information on the printer 33.

The first camera 32 and the second camera 36 read the QR code displayed on the printer 33 using the respective image-acquisition units 106 (F904 and F905). The first camera 32 and the second camera 36 decode the read QR code to acquire information that the QR code indicates. The first camera 32 and the second camera 36 determine whether the information acquired from the QR code is information necessary for setting a communication parameter.

If the first camera 32 and the second camera 36 determines that the information acquired from the read QR code includes identification information on the printer 33, the first camera 32 and the second camera 36 respectively transfer the information to the first AP 34 and the second AP 37 via the respective radio units 104 (F906 and F907).

When the first AP 34 receives the identification information on the printer 33 from the first camera 32, the first AP 34 transmits a search signal for searching for the parameter receiving apparatus (the printer 33) that the identification information indicates (F908).

Assume that the printer 33 receives the search signal including the identification information on the printer 33 from the first AP 34 prior to a search signal from the second AP 37. Upon receiving the search signal including the identification information on the printer 33 from the first AP 34, the printer 33 hides the QR code (F909), and then the printer 33 returns a response signal to the first AP 34 (F910). The first AP 34 transmits a communication parameter for communication via the formed first radio network 31 to the printer 33 by radio (F911).

When the second AP 37 receives identification information on the second camera 36 from the second camera 36, the second AP 37 transmits a search signal for searching for the parameter receiving apparatus (the printer 33) that the identification information indicates (F913). When the printer 33 receives the search signal from the second AP 37, the printer 33 transmits an error response to the second AP 37 (F914) to disable a process for sharing a communication parameter with the second AP 37 because the printer 33 has already started the process for sharing a communication parameter with the first AP 34. Upon receiving the error response, the second AP 37 terminates the process in error (F915).

The printer 33 and the first AP 34 perform the process at F406 and F407 described in the first embodiment (F911 and F912).

Thus, this embodiment gives a high priority to the process for sharing a communication parameter with the first detected apparatus and can enables a process for sharing a communication parameter with the second detected apparatus.

Although the second embodiment has been described as applied to a case where the first AP 34 and the second AP 37 that have received a receiver notification transmit search signals, the first camera 32 and the second camera 36 that have acquired an image of the QR code may transmit search signals as in the first embodiment.

The first embodiment and the second embodiment may be combined as appropriate. For example, if the printer 33 has received a search signal from a second AP before starting a process for sharing a communication parameter with a first AP that has received a search signal first, the printer 33 may disable a process for sharing a communication parameter with the first and second APs as in the first embodiment. Alternatively, if the printer 33 has received a search signal from a second AP after starting a process for sharing a communication parameter with a first AP that has received a search signal first, the printer 33 may disable a process for sharing a communication parameter with the second AP as in the second embodiment.

Other Embodiments

In the above embodiments, information for setting a communication parameter is transferred between the apparatuses using an image of the QR code. In stead of the acquisition of an image of the QR code, radio communication, such as NFC and Bluetooth (a registered trademark), may be used. Alternatively, radio communication, such as IEEE802.11ad and TransferJet (a registered trademark), may be used.

The QR code to be read may be not only a QR code displayed on a display unit but also a QR code affixed to the casing of a communication apparatus in the form of a seal or the like. The QR code to be read may be affixed to an instruction manual or a package, such as a corrugated box, of the communication apparatus on sale. Not the QR code but a barcode or a two-dimensional code other than the QR code may be used. Instead of the QR code and other machine readable information, user-readable information may be used.

Although the above embodiments have been described as applied to a configuration in which the communication among the apparatuses is performed using wireless LAN communication conforming to IEEE802.11, this is not intended to limit the present invention. For example, the communication among the apparatuses may be performed using a radio communication medium such as a wireless USB, MBOA, Bluetooth (a registered trademark), ultra-wideband (UWB), ZigBee, and NFC. MBOA is an abbreviation of multiband OFDM alliance. The UWB includes a wireless USB, wireless 1394, and WINET.

Although the above embodiments have been described as applied to a configuration in which access points of a wireless LAN provide wireless parameters, this is not intended to limit the present invention. For example, the group owner of Wi-Fi Direct (a registered trademark) may provide wireless parameters.

As described above, according to the above embodiments, if a communication apparatus has received identification information in code information displayed by the communication apparatus from a plurality of apparatuses that have acquired an image of the code information, the communication apparatus restricts execution of a communication-parameter sharing process.

In the above embodiments, "restrict execution of the communication-parameter sharing process" includes "disable execution of the communication-parameter sharing process" and "temporarily stop execution of the communication-parameter sharing process and resume the process thereafter.

The present invention can also be achieved by a process for supplying a program for implementing one or more functions of the above embodiments to a system or an apparatus via a network or a storage medium and for reading and executing the program with one or more processors in the system or the apparatus. The present invention can also be achieved by a circuit that performs one or more functions (for example, ASIC).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory apparatus, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-023713, filed Feb. 9, 2015, which is hereby incorporated by reference herein in its entirety.

The invention claimed is:

1. A communication apparatus connectable with an access point, the communication apparatus comprising:
one or more processors; and
one or more memories storing instructions that, when executed by the one or more processors, cause the communication apparatus to perform the following operations:
causing a display to display code information in which information including at least a public key is coded;
receiving a signal including information obtained from the code information from another communication apparatus that has read the code information displayed by the display;
executing a parameter sharing process of obtaining a communication parameter for connecting to an external access point and encrypted based on the public key, based on reception of the signal by the communication apparatus, via wireless communication, from the another communication apparatus; and
if the communication apparatus receives the signal including information obtained from the code information displayed by the display from a plurality of other communication apparatuses within a predetermined period, restricting execution of the parameter sharing process with any of the plurality of other communication apparatuses.

2. The communication apparatus according to claim 1, wherein the restricting executes the parameter sharing process for sharing the communication parameter with none of the plurality of other communication apparatuses.

3. The communication apparatus according to claim 1, wherein the restricting transmits a signal indicating that the parameter sharing process has failed to each of the plurality of other communication apparatuses.

4. The communication apparatus according to claim 1, wherein if the communication apparatus has not received the signal during a predetermined time after the code information is displayed by the display, the parameter sharing process is terminated.

5. The communication apparatus according to claim 1, wherein the code information comprises a barcode and a two-dimensional code.

6. The communication apparatus according to claim 1, wherein the communication apparatus causes the code information in which identification information on the communication apparatus is included, to be displayed as the information necessary for performing the parameter sharing process.

7. The communication apparatus according to claim 1, wherein the communication parameter includes at least one of: an SSID, an encryption key, an encryption method, an authentication key, or an authentication method.

8. The communication apparatus according to claim 1, wherein the communication parameter comprises information for carrying out communication conforming to an IEEE802.11 standard.

9. The communication apparatus according to claim 1, wherein if the communication apparatus has received the signal from the another communication apparatus, the code information is hidden.

10. A method for controlling a communication apparatus connectable with an access point, the method comprising:
displaying code information in which information including at least a public key is coded;
receiving a signal including information obtained from the code information from another communication apparatus that has read the code information displayed;
executing a parameter sharing process of obtaining a communication parameter for connecting to an external access point and encrypted based on the public key, based on reception of the signal received, via wireless communication, from the another communication apparatus; and based on the communication apparatus receiving the signal including information obtained from the code information displayed by the display, from a plurality of other communication apparatuses within a predetermined period, restricting execution of the parameter sharing process with any of the plurality of other communication apparatuses.

11. A non-transitory computer-readable storage medium storing a program for causing a communication apparatus connectable with an access point to perform a process, the process comprising:

displaying code information in which information including at least a public key is coded;

receiving a signal including information obtained from the code information from another communication apparatus that has read the code information displayed;

executing a parameter sharing process of obtaining a communication parameter for connecting to an external access point and encrypted based on the public key, based on reception of the signal received, via wireless communication, from the another communication apparatus; and if the communication apparatus receives the signal including information obtained from the code information displayed by the display, from a plurality of other communication apparatuses within a predetermined period, restricting execution of the parameter sharing process with any of the plurality of other communication apparatuses.

* * * * *